(12) United States Patent
Mackeyev et al.

(10) Patent No.: US 8,128,901 B2
(45) Date of Patent: Mar. 6, 2012

(54) FACILE PURIFICATION OF CARBON NANOTUBES WITH LIQUID BROMINE AT ROOM TEMPERATURE

(75) Inventors: Yuri Mackeyev, Houston, TX (US); Lon J. Wilson, Houston, TX (US)

(73) Assignee: William Marsh Rice University, Houston, TX (US)

( * ) Notice: Subject to any disclaimer, the term of this patent is extended or adjusted under 35 U.S.C. 154(b) by 199 days.

(21) Appl. No.: 12/299,691

(22) PCT Filed: May 7, 2007

(86) PCT No.: PCT/US2007/068376
§ 371 (c)(1),
(2), (4) Date: Jun. 30, 2009

(87) PCT Pub. No.: WO2008/054869
PCT Pub. Date: May 8, 2008

(65) Prior Publication Data
US 2010/0021367 A1  Jan. 28, 2010

Related U.S. Application Data

(60) Provisional application No. 60/798,046, filed on May 5, 2006, provisional application No. 60/799,538, filed on May 11, 2006.

(51) Int. Cl.
*C01B 37/02* (2006.01)
(52) U.S. Cl. .................. 423/461; 423/447.1; 423/447.2; 977/752

(58) Field of Classification Search ............... 423/447.2, 423/461, 455 B; 997/742, 750, 752, 845
See application file for complete search history.

(56) References Cited

U.S. PATENT DOCUMENTS 3,413,094 A * 11/1968 Gibson ......................... 423/461
2002/0159944 A1 * 10/2002 Smalley et al. ............ 423/447.6

FOREIGN PATENT DOCUMENTS

WO  WO 01/12886 A1  2/2001
WO  WO 02/064868 A1  8/2002

OTHER PUBLICATIONS

Yuri Mackeyev and Lon J. Wilson. "Facile Purification of HiPco SWNTs with Liquid Bromine at Room Temperature". Science (2002).*
Zhao-xia Jin, Guo Qin Xu, Suat Hong Goh, A preferentially ordered accumulation of bromine on multi-wall carbon nanotubes, Carbon, vol. 38, Issue 8, 2000, pp. 1135-1139, ISSN 0008-6223, DOI: 10.1016/S0008-6223(99)00237-7. (http://www.sciencedirect.com/science/article/B6TWD-4090JBT-4/2/4ab4afd62fca4eb2422e560554a95c73).*

(Continued)

*Primary Examiner* — Stuart Hendrickson
*Assistant Examiner* — Richard M Rump
(74) *Attorney, Agent, or Firm* — Winstead PC

(57) ABSTRACT

A method of removing metal impurities from carbon nanotubes includes treating carbon nanotubes with distilled bromine in a substantially oxygen- and water-free atmosphere and then removing the distilled bromine from the carbon nanotubes. Purified carbon nanotubes having an iron content from about 2.5 to about 3.5 by weight that are substantially free of derivatization at the ends and defect sites are made available via this method.

11 Claims, 8 Drawing Sheets

OTHER PUBLICATIONS

P. X. Hou, S. Bai, Q. H. Yang, C. Liu, H. M. Cheng, Multi-step purification of carbon nanotubes, Carbon, vol. 40, Issue 1, Jan. 2002, pp. 81-85, ISSN 0008-6223, DOI: 10.1016/S0008-6223(01)00075-6. (http://www.sciencedirect.com/science/article/B6TWD-44CVWWR-9/2/72c0f2fa9185bc377523889dc60034ea).*

Y.Y. Fan, et al., "Single- and multi-wall carbon nanotubes produced using the floating catalyst method: Synthesis, purification and hydrogen uptake", Carbon, 44:2006, pp. 2160-2170.

Y.K. Chen, et al., "Purification and Opening of Carbon Nanotubes via Bromination", Adv. Mater., 8:1996, pp. 1012-1015.

Database WPI Week 200340, Thomson Scientific, 2003-422227, XP02504073.

J. Zhao-Xia, et al., "A preferentially ordered accumulation of bromine on multi-wall carbon nanotubes", Carbon, 38:2000, pp. 1135-1139.

P. Nikolaev, et al., "Gas-phase Catalytic Growth of Single-Walled Carbon Nanotubes from Carbon Monoxide", Chem. Phys. Lett., 313:1999, pp. 91-97.

M.J. Bronikowski, et al., "Gas-phase production of carbon single-walled nanotubes from carbon monoxide via the HiPco process: A parametric study", J. Vacuum Sci. Tech. A: Vac. Surf. Films, 19:2001, pp. 1800-1805.

E. Vazquez, et al., "Microwave-Assisted Purification of HiPco Carbon Nanotubes", Chem. Comm., 20:2002, pp. 2308-2309.

Y.Q. Xu, et al., "Controlled Multistep Purification of Single-Walled Carbon Nanotubes", Nano Lett., 5:2005, pp. 163-168.

A.G. Rinzler, et al., "Large Scale Purification of Single Wall Carbon Nanotubes: Process, Product and Characterization", Appl. Phys. A., 67:1998, pp. 29-37.

I.W. Chiang, et al., "Purification and Characterization of Single-Wall Carbon Nanotubes", J. Phys. Chem. B, 105:2001, pp. 1157-1161.

H. Kataura, et al., "Resonance Raman Scattering of Br2 Doped Single-Walled Carbon Nanotube Bundles", Mol. Crys. Liq. Crys., 340:2000, pp. 757-762.

P.X. Hou, et al., "Purification of single-walled carbon nanotubes synthesized by the hydrogen-arc discharge method", J. Mater. Res., 16:2001, pp. 2526-2529.

H. Kajiura, et al., "High-quality single-walled carbon nanotubes from arc-produced soot", Chem. Phys. Lett., 364:2002, pp. 586-592.

J.M. Moon, et al., "High-Yield Purification Process of Single-walled Carbon Nanotubes", J. Phys. Chem. B, 105:2001, pp. 5677-5681.

A. Yu, et al., "Application of Centrifugation to the Large-Scale Purification of Electric Arc-Produced Single-Walled Carbon Nanotubes", J. Am. Chem. Soc., 128:2006, pp. 9902-9908.

I.W. Chiang, et al., "Purification and Characterization of Single-Wall Carbon Nanotubes (SWCNTs) Obtained from the Gas-Phase Decomposition of CO (HiPco Process)", J. Phys. Chem. B, 105:2001, pp. 8297-8301.

A.M. Rao, et al., "Evidence for charge transfer in doped carbon nanotube bundles from Raman scattering", Nature, 388:1997, pp. 257-259.

H. Kataura, et al., "Diameter control of single-walled carbon nanotubes", Carbon, 38:2000, pp. 1691-1697.

N.I. Denisenko, et al., "Synthesis and Thermal Stability of C60Br8", in "Fullerenes", P.V. Kamat, et al., eds, vol. 11, Electrochemical Society, Inc., 2001, pp. 277-279.

N.I. Denisenko, et al., "New Aspects of the Direct Bromination of [60]Fullerene", Abstract, 199th Meeting of the Electrochemical Society, Washington, DC, 2001, p. 704.

P.G. Johannsen, et al., "Effect of pressure on Raman spectra of solid bromine", J. Phys. C: Solid State Phys., 16:1983, pp. 1961-1965.

S. Shukla, et al., "Use of Bromine for the Removal of Metal Catalysts from Carbon Nanotubes", Abstract P-31, Rice Quantum Institute Sixteenth Annual Summer Research Colloquium, Aug. 9, 2002, Houston, Texas.

S. Shukla, et al., "Use of Bromine for the Removal of Metal Catalysts from Carbon Nanotubes", Poster Presentation, Rice Quantum Institute Sixteenth Annual Summer Research Colloquium, Aug. 9, 2002, Houston, Texas.

B. Wei, "Purification of Single-Wall Carbon Nanotubes by Fluorination and Bromination", Masters Thesis, Lamar University, 2003.

Lamb, et al., "The Preparation of Iodic Acid and its Anhydride", J. Am. Chem. Soc., 1920, 42, 1636-48.

O'Connell, et al., "Band Gap Fluorescence from Individual Single-Walled Carbon Nanotubes", Science, 2002, 297:593-6.

* cited by examiner

FACILE PURIFICATION OF CARBON NANOTUBES WITH LIQUID BROMINE AT ROOM TEMPERATURE

RELATED APPLICATIONS

This application claims the benefit of U.S. Provisional Patent Application No. 60/799,538 filed May 11, 2006 and U.S. Provisional Patent Application No. 60/798,046 filed May 5, 2006. These priority documents are incorporated by reference herein in their entirety.

STATEMENT OF FEDERALLY SPONSORED RESEARCH

This invention was made with government support under Grant No. NSF EEC-011 8007 awarded by the National Science Foundation through a grant to the Center for Biological and Environmental Nanotechnology (CBEN) at Rice University. The government has certain rights in the invention.

FIELD OF THE INVENTION

The present invention relates in general to the purification of carbon nanotubes. More specifically, the invention relates to a method of removing trace metal catalyst impurities used in carbon nanotube synthesis.

BACKGROUND

A widely used method for the catalytic production of single-wall carbon nanotubes (SWCNTs) is the High Pressure CO (HiPco) disproportionation process, where CO gas and an iron-containing catalyst, $Fe(CO)_5$, are combusted under controlled conditions. Nikolaev, P., Bronikowski, M. J., Bradley, R. K., Rohmund, F., Colbert, D. T., Smith, K. A., "Gas-phase Catalytic Growth of Single-Walled Carbon Nanotubes from Carbon Monoxide," Chemical *Physics Letters* 1999, 313: 91. Bronikowski, M. J., Willis, P. A., Colbert, D. T., Smith, K. A., Smalley, R. E., "Gas-phase production of carbon single-walled nanotubes from carbon monoxide via the HiPco process: A parametric study," *Journal of Vacuum Science & Technology, A: Vacuum, Surfaces, and Films* 2001, 19 (4, Pt 2): 1800-5. For many material applications of SWCNTs, the carbon-encased iron(0) impurity that results from the HiPco process must be removed with the least damage possible to the SWCNTs.

Oxidative treatment of SWCNTs, typically using $O_2(g)$ or other reactive oxidants like $HNO_3(aq)$, is widely recommended in literature as a good way to remove carbonaceous impurities and metal catalyst impurities. Vazquez, E., Georgakilas, V., Prato, M., "Microwave-Assisted Purification of HIPCO Carbon Nanotubes," *Chem. Commun.* 2002, 20: 2308-9. Xu, Y. Q., Peng, H., Hauge, R. H., and Smalley, R. E., "Controlled Multistep Purification of Single-Walled Carbon Nanotubes," *Nano Lett.* 2005, 5(1): 163-8. Rinzler, A. G., Liu, J., Dai, H., Nikolaev, P., Huffman, C. B., Rodriguez-Macias, F. J., "Large Scale Purification of Single Wall Carbon Nanotubes: Process, Product and Characterization," *Appl. Phys. A* 1998, 67: 29-37. Chiang, I. W., Brinson, B. E., Huang, A. Y., Willis, P. A., Bronikowski, M. J., Margrave, J. L., et "Purification and Characterization of Single-Wall Carbon Nanotubes," *J. Phys. Chem. B* 2001, 105: 1157-61. Kataura, H., Kumazawa, Y., Kojima, N., Maniwa, Y., Umezu, I., Masubuchi, S., "Resonance Raman Scattering of $Br_2$ Doped Single-Walled Carbon Nanotube Bundles," *Molecular Crystals and Liquid Crystals* 2000, 340: 757-62. Hou, P. X., Liu, C., Tong, Y., Xu, S. T., Liu, M., Cheng, H. M., "Purification of single-walled carbon nanotubes synthesized by the hydrogen arc-discharge method," *J. of Mater. Res.* 2001, 16: 2526-9. Kajiura, H., Tsutsui, S., Huang, H. J., Murakami, Y., "High-quality single-walled carbon nanotubes from arc-produced soot," *Chem. Phys. Lett.* 2002, 364: 586-92. Moon, J. M., An, K. H., Lee, Y. H., Park, Y. S., Bae, D. J., Park, G. S., "High-Yield Purification Process of Single-walled Carbon Nanotubes," *J. Phys. Chem. B* 2001, 105: 5677-81. Yu, A., Bekyarova, E., Itkis, M. E., Fakhrutdinov, D., Webster, R., Haddon, R. C., "Application of Centrifugation to the Large-Scale Purification of Electric Arc-Produced Single-Walled Carbon Nanotubes," *J. Am. Chem. Soc.* 2006; 128(30); 9902-9908. Chiang, I. W., Brinson, B. E., Huang A. Y., Willis, P. A., Bronikowski, M. J., Margrave, J. L., "Purification and Characterization of Single-Wall Carbon Nanotubes (SWCNTs) Obtained from the Gas-Phase Decomposition of CO (HiPco Process)," *J. Phys. Chem. B* 2001, 105: 8297-8301. While they may effectively remove iron impurities, the main disadvantages of oxidative procedures that employ $HNO_3(aq)$ is that the SWCNT material is also significantly damaged, shortened and/or derivatized at the ends of the nanotubes or at defect sites (i.e. with carboxylic acid groups). A non-oxidative acidic treatment (with an acid such as HCl(aq)) is an alternative purification method which does not significantly damage SWCNTs, but it is not as effective at removing other carbonaceous particles and the iron impurity. See Rinzier and Kaijura.

Therefore, it is a desire to provide improved methods for efficiently removing the metal catalyst impurities from carbon nanotubes, while at the same time avoiding derivatization at the ends and at defect sites of the carbon nanotubes.

SUMMARY OF THE INVENTION

In view of the foregoing and other considerations, the present invention relates to the purification of carbon nanotubes. More specifically to the removal of metal impurities from carbon nanotubes.

Accordingly, in some aspects the present invention provides a method of removing metal impurities from carbon nanotubes. The method includes treating carbon nanotubes with distilled bromine in a substantially oxygen- and water-free atmosphere and then removing the distilled bromine from the carbon nanotubes.

In other aspects, the present invention provides purified carbon nanotubes having an iron content from about 2.5% to about 3.5% by weight that are substantially free of derivatization at the ends and defect sites.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein.

DETAILED DESCRIPTION

Figure 1A:
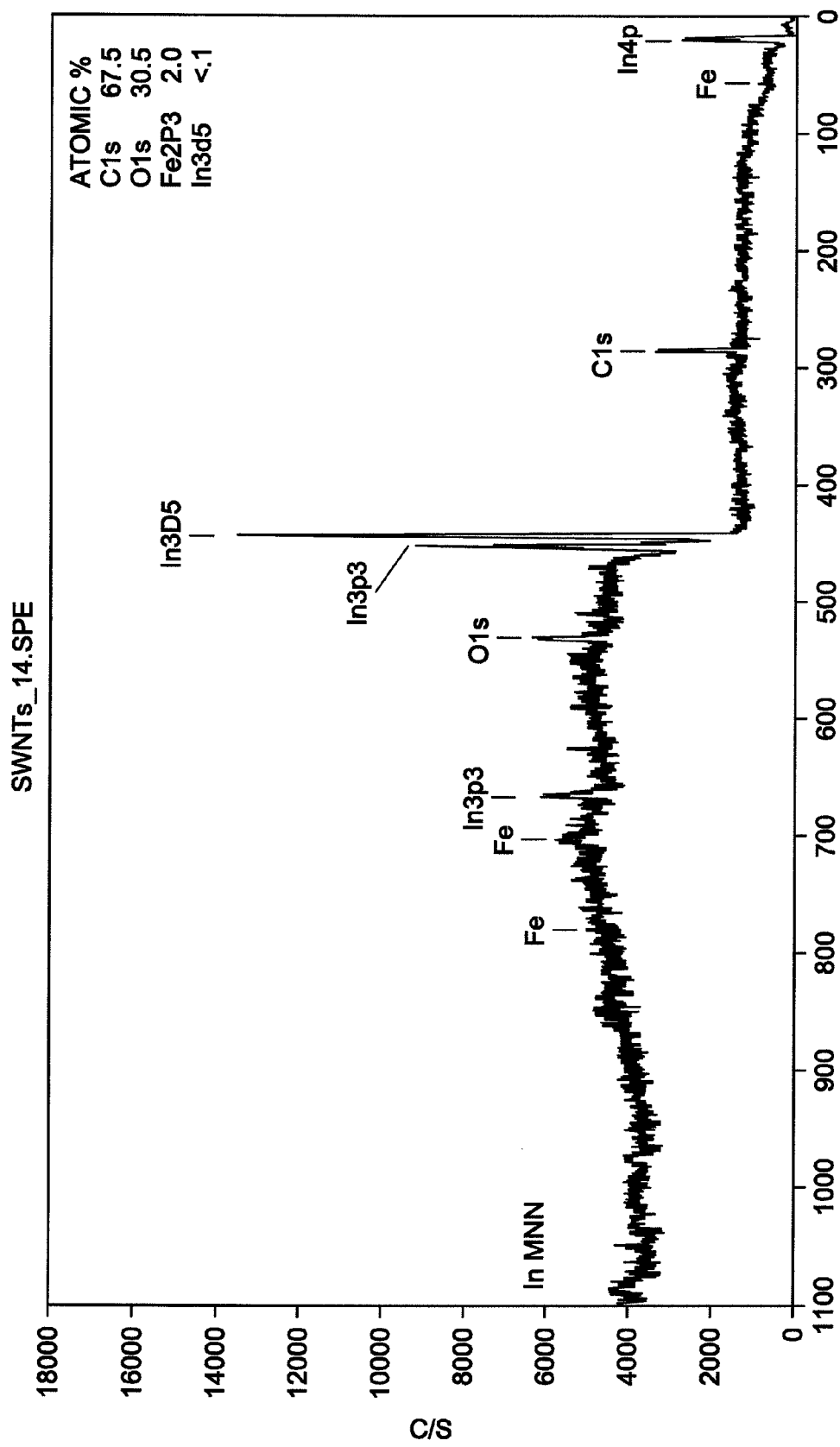
FIG. 1 a) shows an XPS surface elemental analysis obtained for a raw SWNT sample and b) shows an XPS surface elemental analysis obtained for a $Br_2(l)$-purified sample.

The present invention generally provides a method of removing metal impurities from carbon nanotubes which includes treating carbon nanotubes with distilled bromine in a substantially oxygen- and water-free atmosphere. Generally the reaction may be carried out under a dry nitrogen or argon atmosphere or other inert gas which has been appropriately been dried and determined to be substantially oxygen free. The purification by reaction with bromine may be conveniently carried out at room temperature. The distilled bromine is removed from the carbon nanotubes after a period of time, typically about thirty minutes.

In some embodiments the carbon nanotubes may include single-wall carbon nanotubes (SWCNTs), multi-wall carbon nanotubes, and double wall carbon nanotubes. Additionally, the method described herein may also be carried out on mixtures of these carbon nanotube types. One skilled in the art would recognize that SWCNTs are relatively more reactive than the multi-wall carbon nanotube counterparts, and thus a procedure developed for SWCNTs would likely be applicable to the higher multi-wall carbon nanotube types.

The purification of the present invention addresses the removal of metal impurities which are generally the catalyst used in their preparation. This may include, but is not limited to iron, nickel, yttrium, and any of these metal oxides. Iron is generally one of the more common metal catalysts used in SWCNT synthesis. Iron may be found in approximately 26.8% by weight in the carbon nanotubes prior to purification. Carbon nanotubes purified as disclosed herein may have an iron content ranging from about 1% to about 4% by weight. In some embodiments, the treated carbon nanotubes may have an iron content ranging from about 2.5% to about 3.6% by weight.

In accordance with embodiments of the present invention, the carbon nanotubes are treated with distilled bromine for about thirty (30) minutes. Bromine distillation is preferred due to the presence of chlorine impurities in bromine which may introduce derivatization at the ends and at defect sites in the carbon nanotubes. After removing the distilled bromine, the iron content is about 2.5-3.5% by weight. The carbon nanotubes may be treated with distilled bromine a second time for about thirty (30) minutes in order to reduce the iron content from about 1.6% to about 1.8% by weight. However, derivatization of the ends and at site defects on the carbon nanotubes may occur upon this second exposure to bromine. To remove the bulk bromine, the mixture of carbon nanotubes and bromine are subjected to a rapid flow of dry nitrogen to remove the excess bromine. Intercalated bromine is then removed by heating the carbon nanotubes to about 400° C. in an inert atmosphere, such as nitrogen.

In some embodiments, the present invention provides purified carbon nanotubes having an iron content from about 2.5% to about 3.5% by weight that are substantially free of derivatization at the ends and defect sites. This may be accomplished upon a single 30 minute exposure of the carbon nanotubes to bromine.

Advantageously, the present invention provides a method of purifying carbon nanotubes that uses $Br_2(l)$ as an oxidant to produce SWCNTs of high purity (ca. 1-4% by weight iron) without elevated temperatures and pressures and with minimal sidewall damage, including SWCNTs that are substantially free of derivatization at the ends or defect sites of the SWCNTs. The method presents a convenient laboratory procedure, is commercially viable, since $Br_2(l)$ is relatively inexpensive and can be recycled. In addition, the energy cost of the process is relatively low, and SWCNT purity and integrity have been judged to be generally as good or better than can be obtained by alternative oxidative purification methods.

EXAMPLE

Raw HiPco SWCNTs were obtained from Carbon Nanotechnologies, Inc., of Houston, Tex. (iron content 26.8% by weight, measured by inductively-coupled-plasma atomic emission spectrometry, ICP-AE). Liquid bromine was purchased from Acros Organics, distilled over $P_2O_5$ and NaBr under dry $N_2(g)$ and stored at room temperature, free from $O_2$ and $H_2O$. It is important to purify the liquid bromine by distillation, since some sources of bromine also contain chlorine as a contaminate which can contribute to SWCNT degradation under the conditions of this purification procedure. It is also important to rigorously exclude $H_2O$ and $O_2$ during the procedure for the reasons discussed below.

General Procedure

In a typical procedure, 20 mg of raw SWCNTs were stirred with 10 ml of $Br_2(l)$ under dry $N_2(g)$ at room temperature for different periods of time. Purification generally improved with time up to 30 minutes, but after 30 minutes, the iron content of the purified sample did not decrease further, even for reaction times as long as 480 hours. The SWCNT sample appeared to dissolve completely in the liquid bromine. The $Br_2(l)$ was then removed by gradual evaporation in a stream of dry $N_2(g)$. The resulting solid was washed at room temperature with dilute HCl (approx. 0.1M) accompanied by low-power sonication, followed by DI water, and finally the sample was dried in the air at RT. After this treatment, the SWCNT sample contained up to 30% by weight of intercalated bromine which was removed later by heating the sample for 1 hour at 400° C. under dry $N_2(g)$.

Product Characterization

Figure 1B:
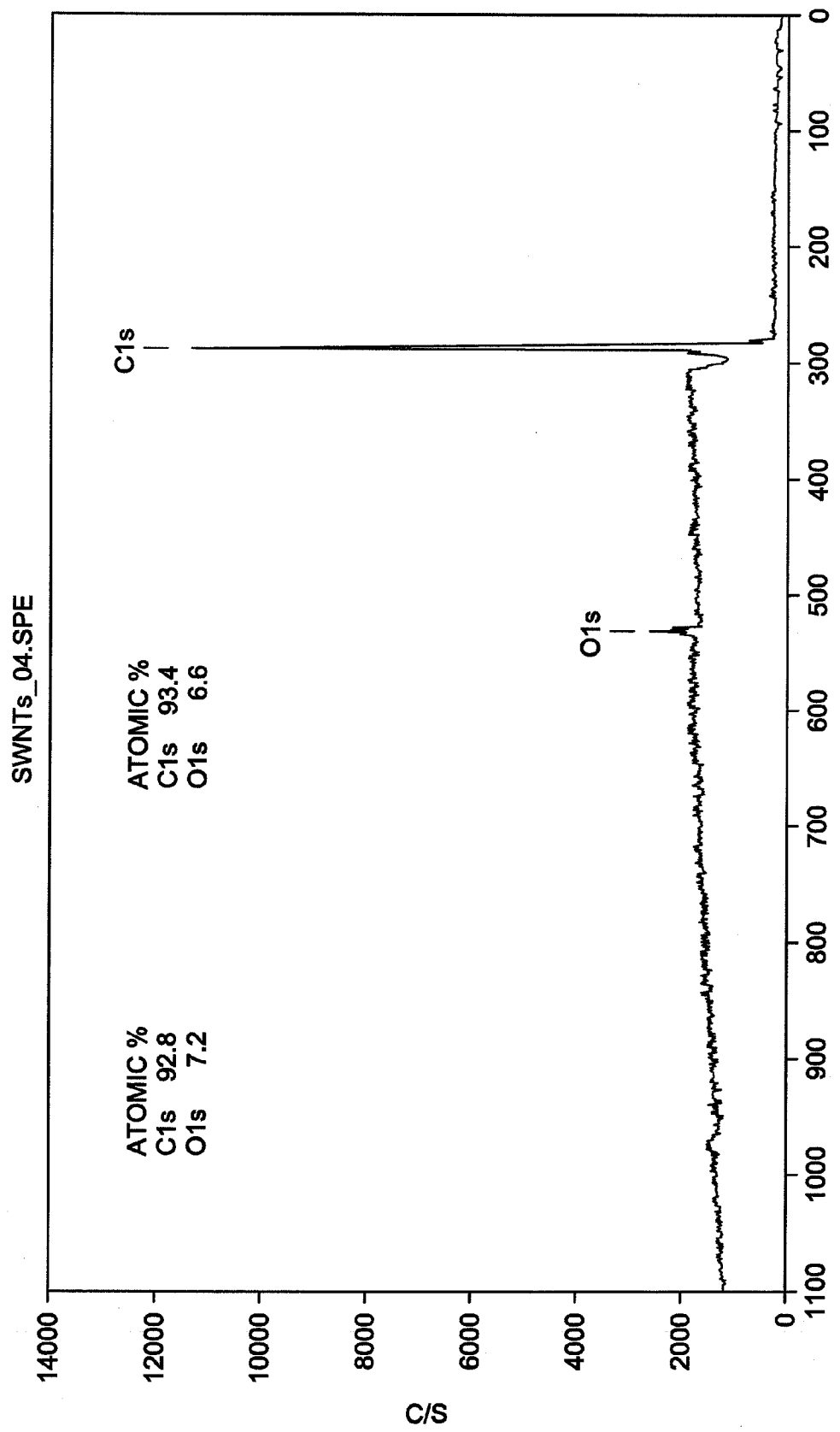

Complete bromine removal was verified by XPS; AES/XPS surface analysis showed iron content improvement (decrease) together with some decrease in oxygen content as shown in FIGS. 1a and 1b. The iron impurity for SWCNT samples treated in this manner was in the range of 2.8-3.6% by weight for SWCNTs stirred with $Br_2(l)$ for 4 hours at room temperature or sonicated for 30 minutes at room temperature. Elevated temperatures did not produce significant reduction in iron content, but did decrease the required treatment time. An additional second cycle of the procedure reduced the iron content to 1.6-1.8%. Once used, $Br_2(l)$ in a closed system can be recycled for additional procedures, with only a small loss (<2%) per cycle.

Other halogen compounds, including $ICl(l)$, $IBr(l)$ and $I_2(l)$, were also tested and compared to the $Br_2(l)$ procedure. In general, the final SWCNT material, purified by the other halogen compounds but using the same procedure as for $Br_2(l)$, contained larger amounts of iron and required higher temperatures such as ICl: 30-60° C. (6% iron); IBr: 50-80° C. (8% iron); $I_2$: 120-160° C. (9% iron). Solutions of bromine in $CCl_4$ or $CS_2$, and in a concentrated aqueous solution of NaBr, gave purification results in the range of 8-16% iron.

Iron analyses were performed by ICP-AE on a Perkin-Elmer Optima 4300 DV instrument. To prepare a sample for analysis, 0.2-0.5 mg (Cahn Instruments, Inc C-31 microbalance) of the SWCNT material was treated with hot chloric acid (26% by weight), prepared by a literature procedure, for 10 minutes until the sample dissolved completely. Lamb, A. B., Bray, W. C., Geldard, W. I., "The Preparation of Iodic Acid and its Anhydride." *J. Am. Chem. Soc.*, 1920, 42, 1636-48. A few drops of HCl (aq) (36% by weight) were then added, and the reaction was let stand at 90° C. until the yellow color changed to a colorless solution (usually <1 min). The sample was then cooled to 20° C., diluted with 2% $HNO_3$(aq) to 10 ml in a volumetric flask and used for ICP-AE analysis. NIR photoluminescence spectra were obtained using a SPEX Fluorolog 3-22 Spectrofluorimeter with an InGaAs photodiode photodetector with $N_2(l)$ cooling. Slits were set to 14.0 nm (excitation) and 4 nm (emission); the scan rate was 1.0 nm s$^{-1}$. All emission spectra were corrected for fluctuations in the excitation lamp intensity. For the laser-excited NIR luminescence experiments, the SWCNT sample was suspended in 1.0 wt % Sodium Dodecylbenzene Sulfate (SDBS) solution with sonication for a concentration of 1.0 mg·ml$^{-1}$, and spectra were taken in 1 mm quartz cuvettes. O'Connell, M. J., Bachilo, S. M., Huffman, C. B., Moore, V. C., Strano, M. S., Haroz, E. H., "Band Gap Fluorescence from Individual Single-Walled Carbon Nanotubes," *Science* 2002, 297: 593-6. Transmission electron microscopy (TEM) images were obtained using a JEOL 2010 Transmission Electron Microscope; samples were prepared with Lacey carbon film on a 300 mesh copper grid. Raman spectra were recorded with a Renishaw Microraman.

Figure 2A:
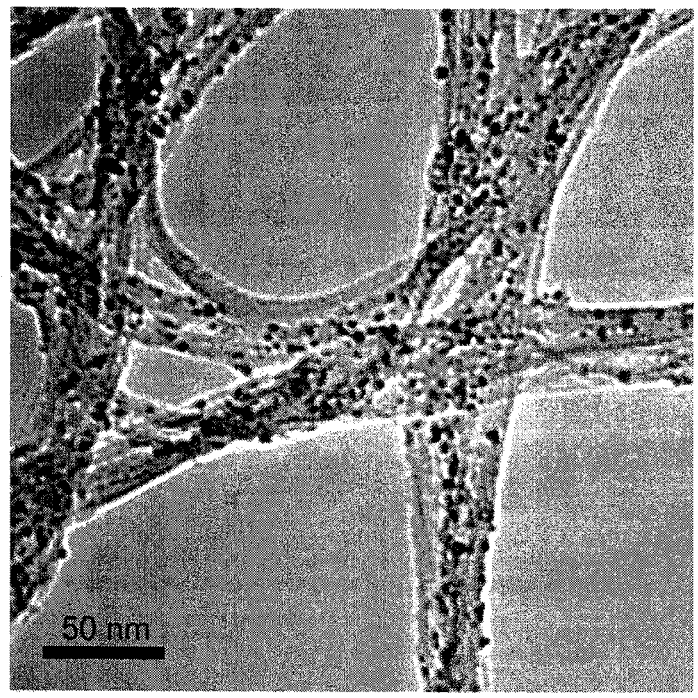
FIG. 2 a) shows TEM images of raw SWCNTs and b) shows $Br_2(l)$-purified SWCNTs purified to a residual iron content of ca. 3% by weight.
Figure 2B:
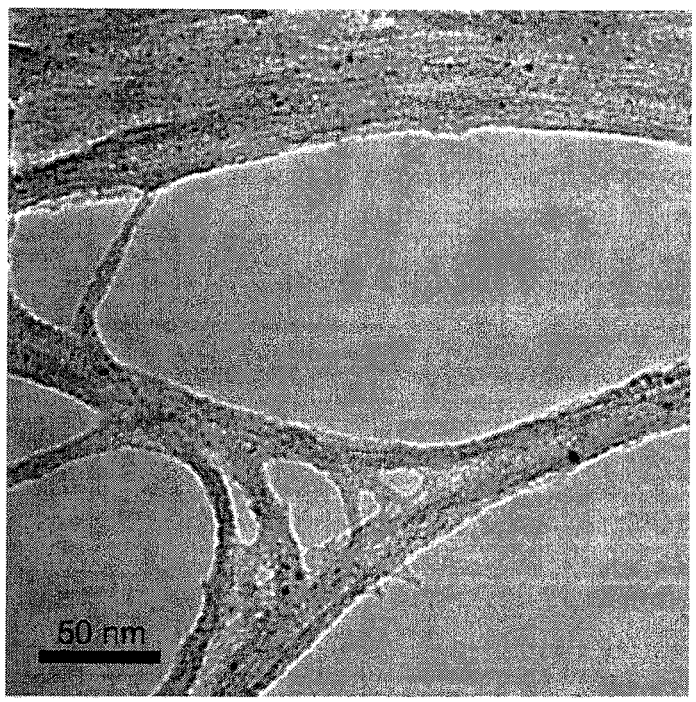

The $Br_2(l)$ purification procedure as described herein (room temperature, 4 hours), reduced the iron content of a HiPco SWCNT sample from ca. 27% to ca. 3% by weight for three different samples. A second treatment reduced the content further to ca. 1.7% iron. These values compare favorably with the best that can be accomplished using other oxidative/acidic procedures, as described in the literature and as summarized in Table I. Our attempts to reproduce the literature procedures are also documented in Table I. In general, our results agree reasonably well with available literature reports, except for the HCl purification procedure which could not be reproduced. See Moon. FIG. 2 displays comparative TEM images of a typical sample of raw SWCNTs (ca. 27% by weight iron) and a purified SWCNT sample (ca. 3% by weight iron) after one cycle of the $Br_2(l)$ purification procedure.

TABLE I

Comparison of the oxidative/acidic purification procedures for HiPco SWCNTs

| Purification procedure | % by weight iron remaining after purification, (lit, %) | % by weight iron remaining after purification[a], (this work, %) | NIR luminescence intensity (this work)[b] |
|---|---|---|---|
| HCl (35%), 4 hr at 60° C. | <1 | 10.2-14.4 | good |
| Microwave irradiation for 2 min, then HCl (35%), 4 hr at 60° C. | 9 | 10.8-12.6 | good |
| Microwave irradiation for 20 min, then HCl (35%), 4 h at 60° C. | 7 | 10.5-12.5 | good |
| $H_2SO_4$(98%) + $HNO_3$(70%), 4 hr at 60° C. | N/A | 9.7-14 | poor |
| $H_2SO_5$(25%)[c], 10 min at 20° C. | N/A | 13.9-14.8 | good |
| $HNO_3$(10%), 4 hr at 60° C. | <1 | 0.6-0.8 | poor |
| $O_2$ + $SF_6$(g) at 200-400° C., for 3-7 days, then HCl(35%), 12 hr at 60° C. | 1.5 | 3.0 | good |
| $Br_2(l)$, room temperature, 4 hr | N/A | 2.8-3.6[d] | good |
|  |  | 1.6-1.8[e] | poor |

[a]Iron analysis by ICP-AE; the sample handling procedure for the present results is described herein. The values reported are the range of values obtained for three different samples.
[b]Comparison with the NIR luminescence intensity of the original unpurified, raw SWCNTs (100%); an intensity greater than 25% of the original is considered as "good", below 5% - as "poor"; excitation laser at 660 nm with luminescence observed in the 900-1600 nm range.
[c]$H_2SO_4$ mixed with $H_2O_2$ (30%) at 0° C., then diluted with water.
[d]After a first purification cycle.
[e]After a second purification cycle.

Figure 3:
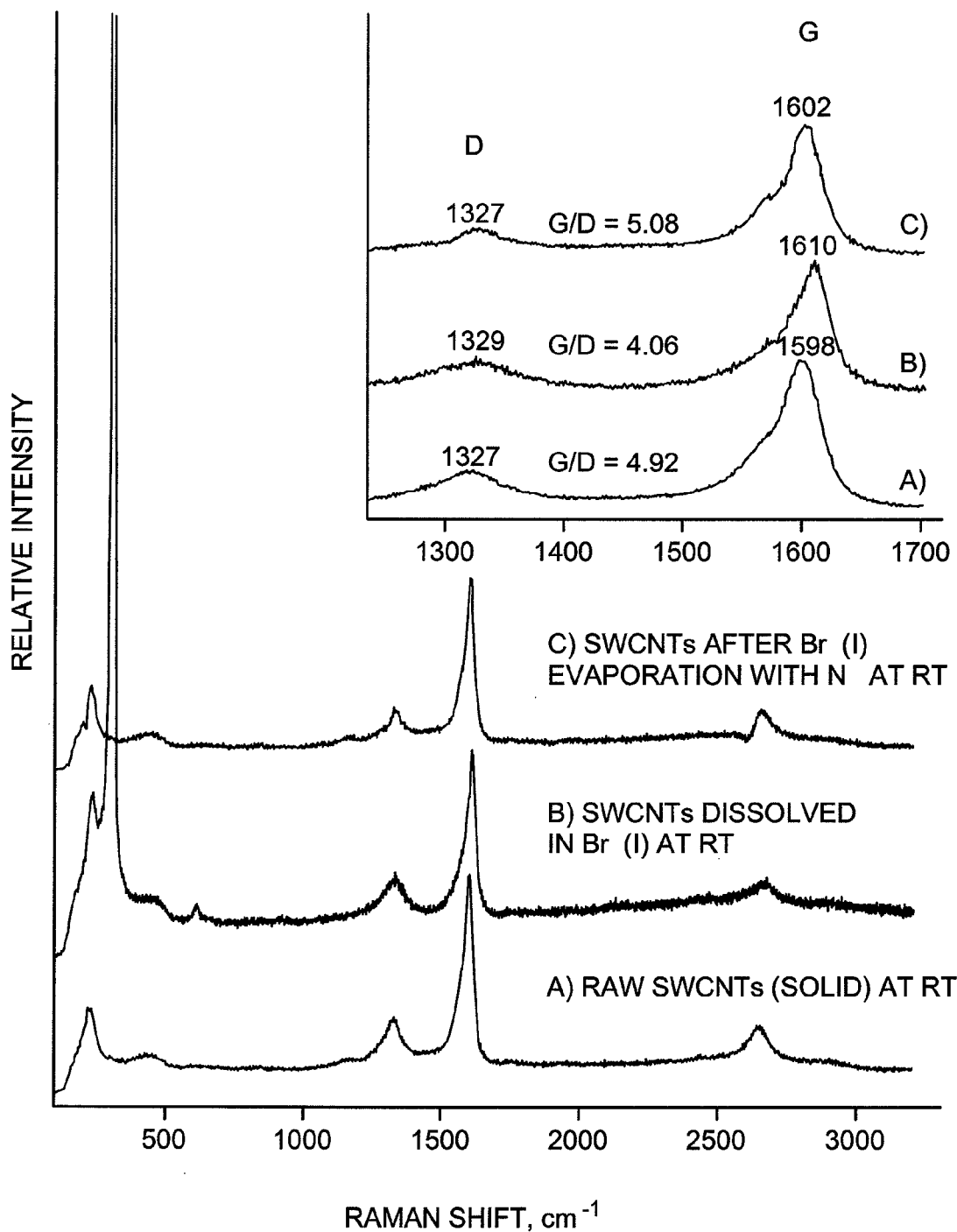
FIG. 3 shows the Raman spectrum of raw SWCNTs and SWCNTs in liquid bromine contained in a partially-sealed quartz ampoule to allow for the controlled evaporation of the $Br_2(l)$. Inset shows the expanded 1300-1700 $cm^{-1}$ region of the spectrum (633 nm laser) with the G/D band intensity ratios documented.

The full Raman spectrum at RT for a raw HiPco SWCNT sample in the solid state is shown in FIG. 3a, while the spectrum for the same sample dissolved in dry liquid bromine (1.0 g per 100 ml) is displayed in 3b. The strong signal at 308 cm$^{-1}$ in FIG. 3b is due to the symmetrical Br—Br stretching mode of the liquid bromine solvent. Two regions of special interest (the D- and G-bands) in the spectra were investigated. As previously reported, the tangential mode (or G-mode) band in the 1550-1600 cm$^{-1}$ region of the spectrum increased in energy when a SWCNT sample is doped with liquid bromine. Rao, A. M., Bandow, S., Thess, A., and Smalley, R. E., "Evidence for charge transfer in doped carbon nanotube bundles from Raman scattering," *Nature* 1997, 388: 257-9. In the present case, this band increased from 1598 cm to 1610 cm$^{-1}$ ($\Delta_f$=+12 cm$^{-1}$) which suggests a partial oxidation of the SWCNT's carbon π*-states by the formation of a charge-transfer complex with $Br_2(l)$. Similar shifts have been reported previously for SWCNTs in liquid bromine ($\Delta_f$=+23 cm$^{-1}$). See Rao. This partial oxidation appears to be reversible, since after $Br_2(l)$ evaporation in vacuum at 60° C., the G-mode band nearly returned to its initial position (FIG. 3c).

However, the sample of FIG. 3c still contained ca. 20 wt % bromine, which likely explains the small residual observed shift ($\Delta_t$=+4 cm$^{-1}$) in the band. The intensity ratio of the G-band to the D-band for pristine and Br$_2$(l) purified SWCNTs were compared to monitor the purity of the SWNTs. Kataura, H., Kumazawa, Y., Maniwam, Y., Otsuka, Y., Sen, R., Suzuki, S., "Diameter control of single-walled carbon nanotubes," *Carbon* 2000, 38: 1691. The G/D band intensity ratio decreased from 4.92 to 4.06 upon formation of the charge-transfer complex with Br$_2$ but return to very near the initial value (5.08) upon evaporation of the Br$_2$(l), as shown in the FIG. 3c inset. Under the same conditions, a careful search of the IR spectrum in the 450-700 cm$^{-1}$ region revealed no band that could be assigned to a C—Br stretching frequency as is found for the case when small fullerenes, like C$_{60}$ and C$_{70}$, react with Br$_2$(l) at RT. Denisenko, N. I., Troshin, P. A., Boltalina, O. V., Mackeyev, Y. A., Serov, M., Chelovskaya, N. V., "Synthesis and Thermal Stability of C$_{60}$Br$_8$," In: Kamat, P. V., Guldi, D. M., Kadish, K. M., editors. Fullerenes, vol 11, *Electrochem. Soc., Inc.* 2001; 277-9. Denisenko, N. I., Troshin, P., Boltalina, O. V., Mackeyev, Y. A., Serov, M., Chelovskaya, N. V., "New Aspects of the Direct Bromination of [60]Fullerene," Abstract, 199th Meeting of the Electrochem. Soc.—Washington, D.C., Mar. 25-29, 2001; 704.

Figure 4:
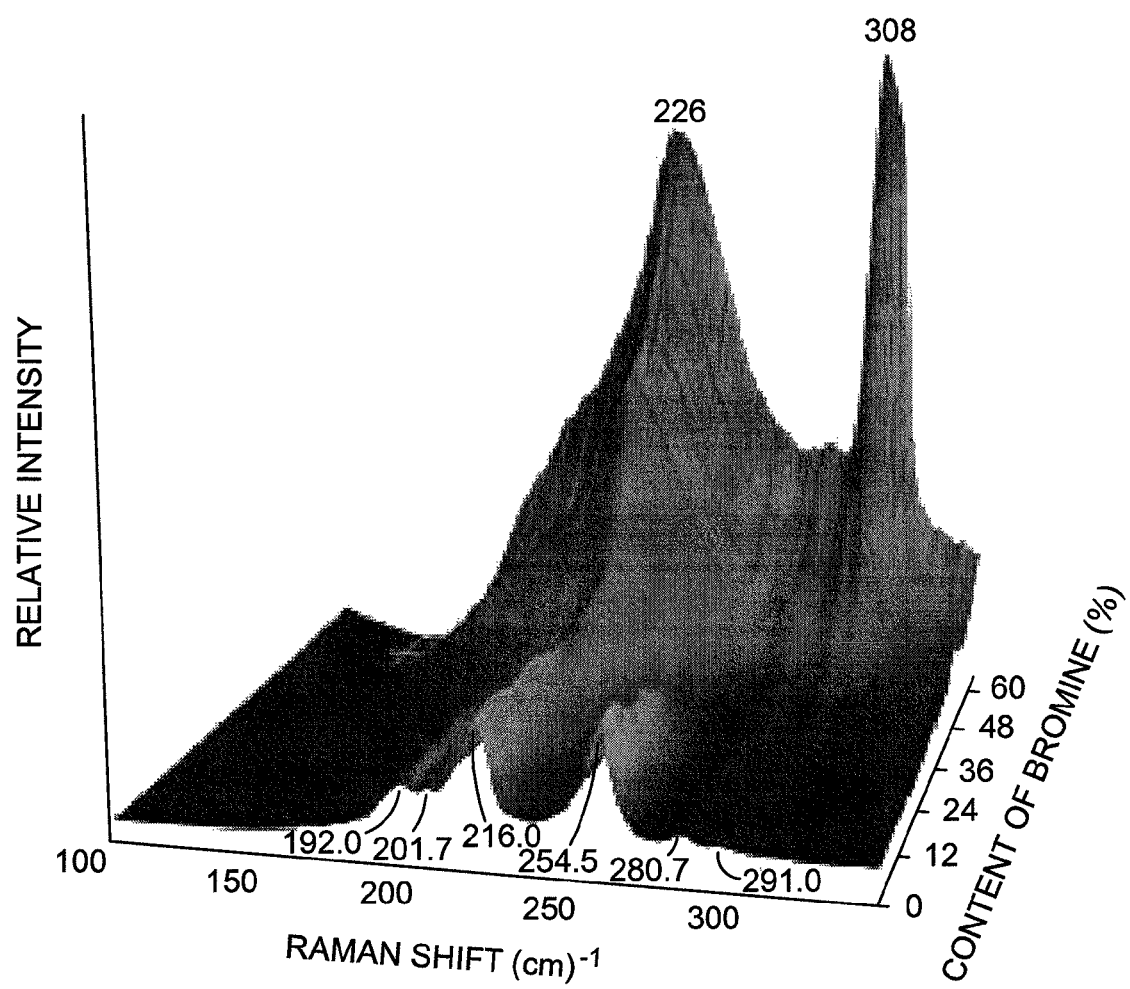
FIG. 4 shows the Raman spectrum of the 100-350 $cm^{-1}$ "breathing mode" region of raw SWCNTs and raw SWCNTs in liquid bromine at RT.

The most significant changes in the Raman spectrum occurred in the 100-350 cm$^{-1}$ SWCNT breathing mode region when SWCNTs were dissolved in Br$_2$(l). These changes are documented in FIG. 4. In a typical experiment, 20 mg of SWCNTs and 80 mg of Br$_2$(l) were placed together in a partially-sealed quartz ampoule which allowed for the controlled evaporation of Br$_2$(l) at reduced pressure and/or elevated temperature (up to 60° C.); the bromine content was then calculated by weighing the ampoule immediately after the Raman spectrum was recorded. As seen in FIG. 4 (which utilized 12 successive data scans of varying Br$_2$(l) concentration to construct the profile) when the Br$_2$(l) content increased to ca. 30% by weight, the original SWCNT normal breathing modes nearly disappeared. In their place, two new prominent bands grew in at 308 cm$^{-1}$ which corresponds to the Br—Br symmetrical stretch of Br$_2$(l) and at 226 cm$^{-1}$ corresponding to Br$_2$(solid), as have been suggested for the case of bromine intercalated in graphite at RT. Johannsen, P. G., Holzapfel, W. B., "Effect of pressure on Raman spectra of solid bromine," *J. Phys. C. Solid State Phys.* 1983, 16: 1961-65.

Figure 5:
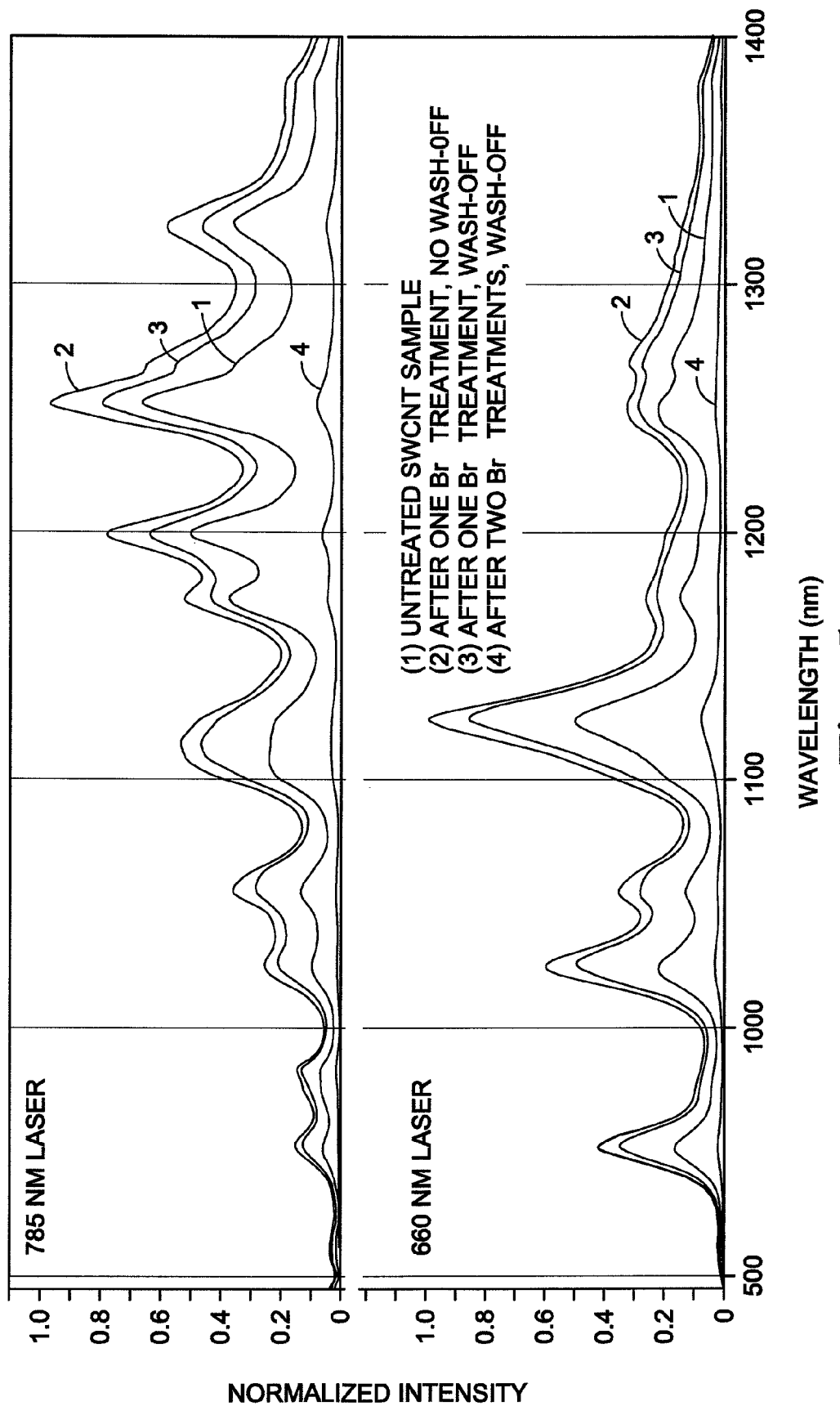
FIG. 5 shows the relative NIR photoluminescence spectra for the SWCNT samples as suspensions in aqueous SDBS solution for both the 660 nm and the 785 mn laser excitation energies.
Figure 6:
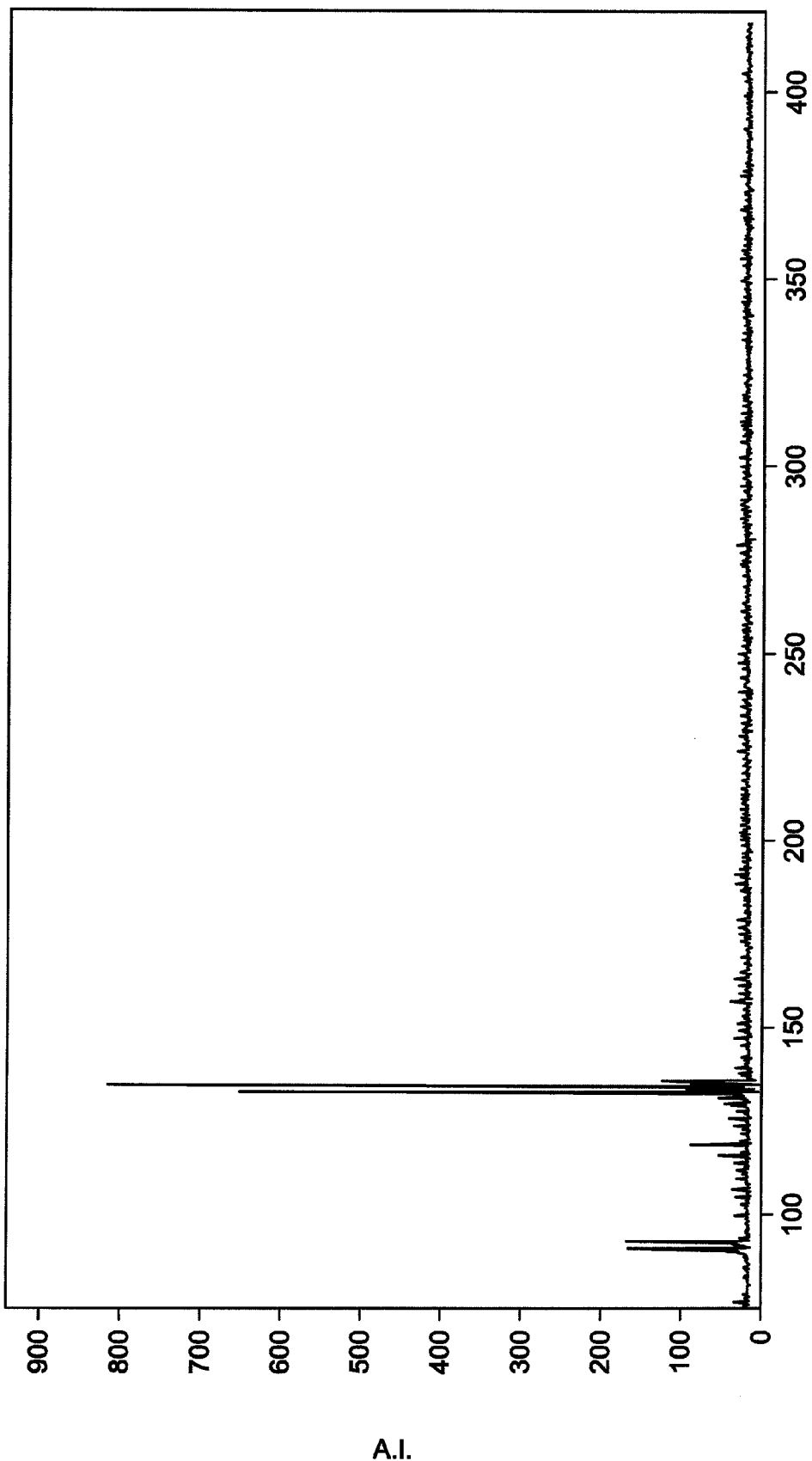
FIG. 6 shows a MALDI MS of $HBrO_3$ (showing $H_2BrO_3^+$ ion), formed from $Br_2(l)$, $H_2O(l)$ and $O_2(g)$ in the presence of SWNTs.

In order to assess the integrity of the SWCNT sample after purification by the Br$_2$(l) process, the IR luminescence spectrum of the sample for the semiconducting SWCNTs, as a suspension in 1.0% SDBS, was measured before and after purification, as shown in FIG. 5. This method was chosen to evaluate SWCNT sample integrity because NIR fluorescence of HiPco SWCNTs is known to be a sensitive measure of sidewall integrity and/or lack of sidewall derivatization. See O'Connell. As shown in FIG. 5, the NIR luminescence spectrum of a Br$_2$(l)-purified SWCNT sample actually increased in intensity (at both excitation wavelengths) after a single purification treatment with Br$_2$(l). This result is reasonable since the sample, after one purification cycle, contained more SWCNTs by weight than did the sample before purification (all spectra in FIG. 5 are for solutions prepared using 0.5 mg/ml of sample in 1.0% SDBS). This result could be reproduced only if the Br$_2$(l) was kept strictly anhydrous and O$_2$-free. The question of SWCNT degradation by bromine in the presence of O$_2$ and H$_2$O is not yet completely clear. We have observed the formation of bromic acid within minutes under such conditions, so water is apparently converted quickly into HBrO$_3$(aq). This possibility is supported by MALDI-TOF mass spectral data which identified the H$_2$BrO$_3^+$ ion (M$_p^+$=128.9, 130.9), as shown in FIG. 6. Since Br$_2$(l) itself is stable towards H$_2$O(l) and O$_2$(g) at RT, a catalytic role for SWCNTs in the production of HBrO$_3$ seems likely. In addition, the formation of hypobromous acid, HBrO (a stronger oxidizing agent than HBrO$_3$), as an intermediate on the path to HBrO$_3$ production, may help explain the observed decrease in IR luminescence intensity of SWCNTs in the presence of O$_2$ and H$_2$O.

Figure 7:
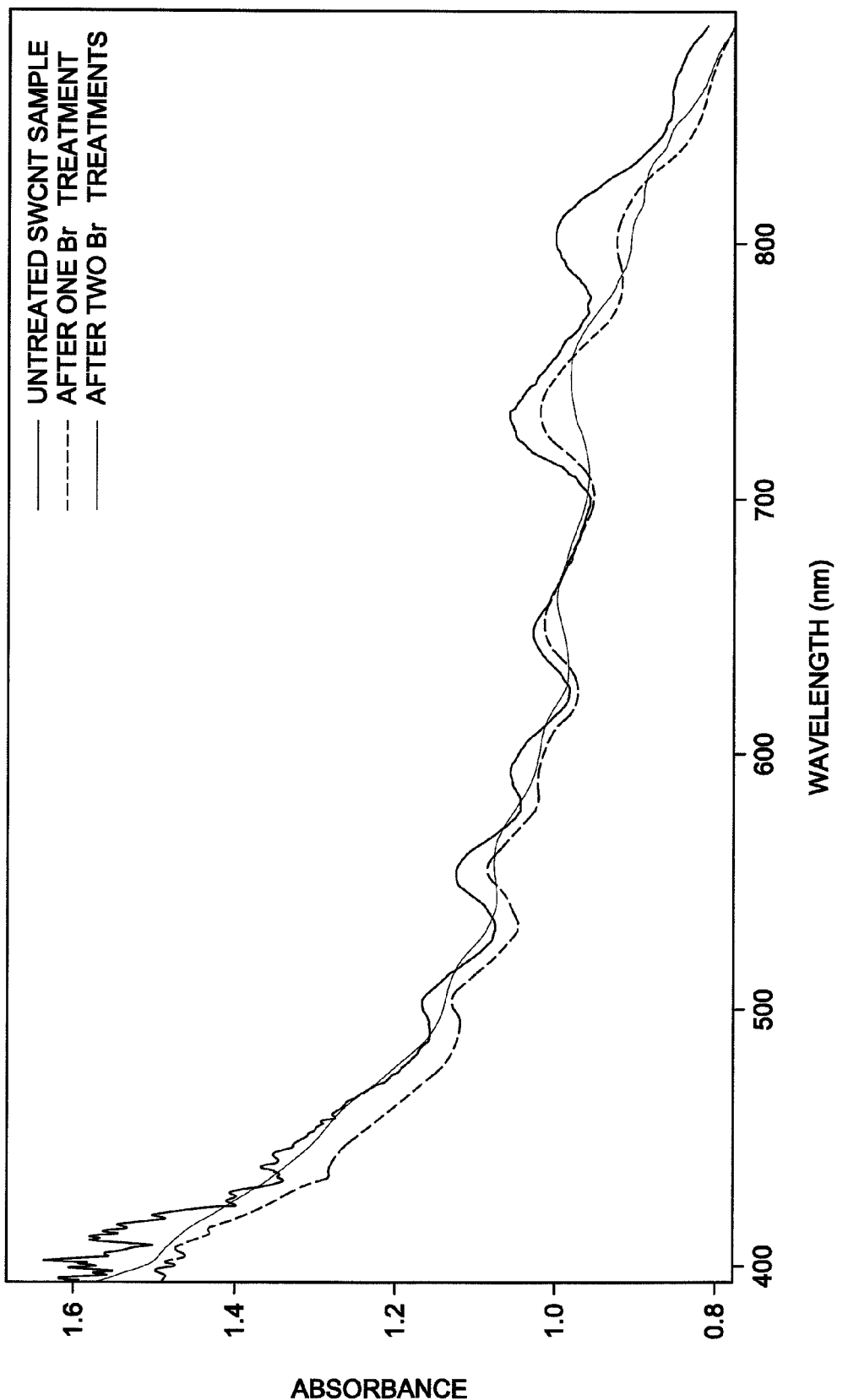
FIG. 7 shows a comparison of Vis-NIR absorption spectra for untreated SWCNTs, SWCNTs after one $Br_2(l)$ treatment and after two $Br_2(l)$ treatments (at 0.5 mg/ml in 1.0% SDBS).

No dependence between treatment time with Br$_2$(l) and the NIR luminescence intensity, which reflects the final sample quality, was found. However, after a second cycle of the Br$_2$(l) purification, the luminescence intensity decreased dramatically to <5% of that for an untreated SWCNT sample. While a second treatment lowered the iron content from ca. 3% to 1-2% by weight, it also apparently produced some sidewall damage to an extent that is comparable to purification procedures employing strongly oxidizing acids such as HNO$_3$ or a H$_2$SO$_4$/HNO$_3$ mixture at elevated temperatures (see Table I). Thus, if SWCNT sidewall integrity is of paramount importance, restricting purification to a single Br$_2$(l) cycle would seem to be recommended. This is apparently true for both semiconducting and metallic SWCNTs as demonstrated by the Vis-NIR absorption data in FIG. 7 because bands for semiconducting tubes (660 nm, 730 nm, and 800 nm) and bands for the metallic tubes (500 nm and 550 nm) are similarly affected by the Br$_2$(l) treatment. Judging from the information in Table I, the O$_2$/SF$_6$ purification procedure and the present single-cycle Br$_2$(l) procedure are the two best procedures that are, at the same time, especially good at removing iron impurity while maintaining SWCNT sample integrity as judged by NIR fluorescence measurements. The liquid bromine procedure, however, is far faster, easier and less costly.

From the foregoing detailed description of specific embodiments of the invention, it should be apparent that a method for purifying carbon nanotubes that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method of removing metal impurities from carbon nanotubes comprising:
    treating carbon nanotubes with distilled anhydrous liquid bromine in a substantially oxygen- and water-free atmosphere; and
    removing the distilled anhydrous liquid bromine from the carbon nanotubes.

2. The method of claim 1, wherein the carbon nanotubes are selected from the group consisting of single-wall carbon nanotubes, multi-wall carbon nanotubes, and double wall carbon nanotubes.

3. The method of claim 2, wherein the carbon nanotubes are single-wall carbon nanotubes.

4. The method of claim 1, wherein the metal impurities are selected from the group consisting of iron, nickel, yttrium, and oxides thereof.

5. The method of claim 4, wherein the treated carbon nanotubes have an iron content ranging from about 1% to about 4% by weight.

6. The method of claim 5, wherein the treated carbon nanotubes have an iron content ranging from about 2.5% to about 3.6% by weight.

7. The method of claim 1, wherein the step of treating the carbon nanotubes with distilled anhydrous liquid bromine is carried out for about thirty (30) minutes.

8. The method of claim 7, wherein after removing the distilled anhydrous liquid bromine, the carbon nanotubes are treated with distilled anhydrous liquid bromine a second time for about thirty (30) minutes.

9. The method of claim 8, wherein the treated carbon nanotubes have an iron content ranging from about 1.6% to about 1.8% by weight.

10. The method of claim 1, wherein the step of removing the distilled anhydrous liquid bromine comprises:

evaporating excess distilled anhydrous liquid bromine with a rapid stream of an inert gas; and heating the carbon nanotubes to about 400 C.

11. The method of claim 1, wherein the step of removing the distilled anhydrous liquid bromine comprises evaporating excess distilled anhydrous liquid bromine.

* * * * *